Aug. 25, 1936.  R. D. SMITH  2,052,257
AUTOMATIC WHEEL ALIGNER
Filed Jan. 22, 1934  2 Sheets-Sheet 1
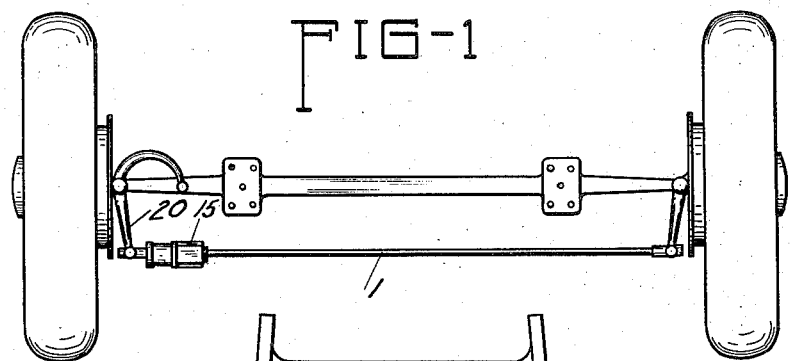
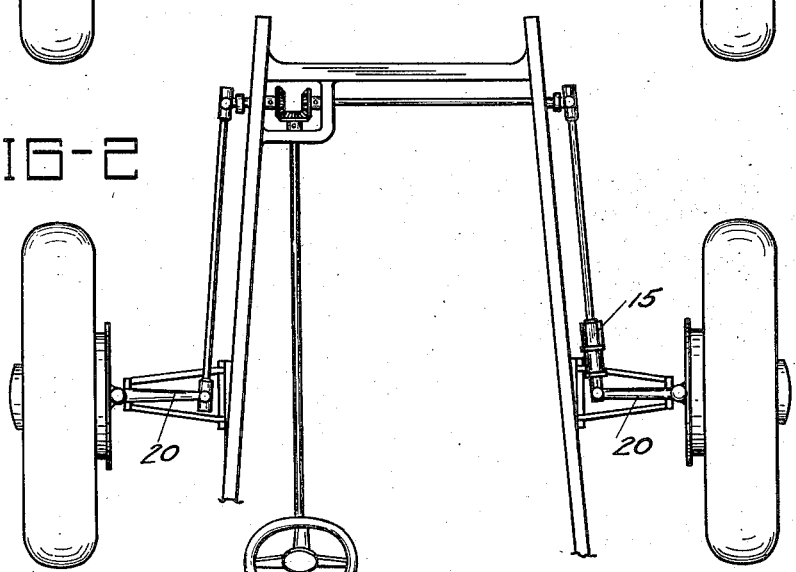
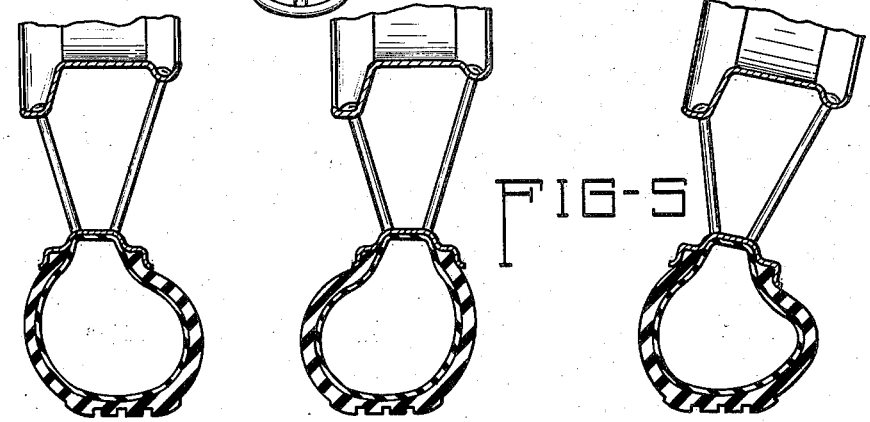
ROY D. SMITH INVENTOR.
BY
Merrill M. Blackburn
ATTORNEY.

Aug. 25, 1936.　　　R. D. SMITH　　　2,052,257
AUTOMATIC WHEEL ALIGNER
Filed Jan. 22, 1934　　2 Sheets-Sheet 2
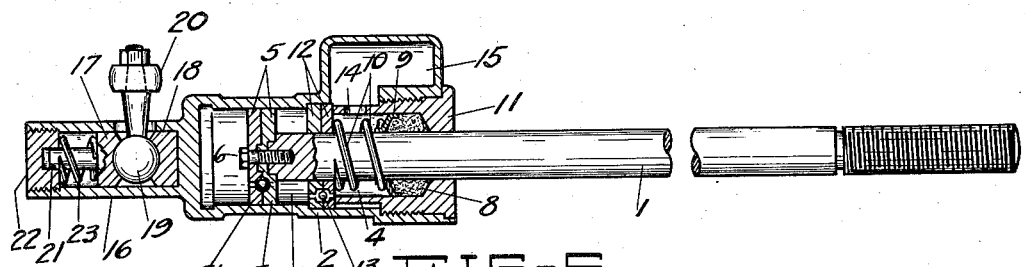
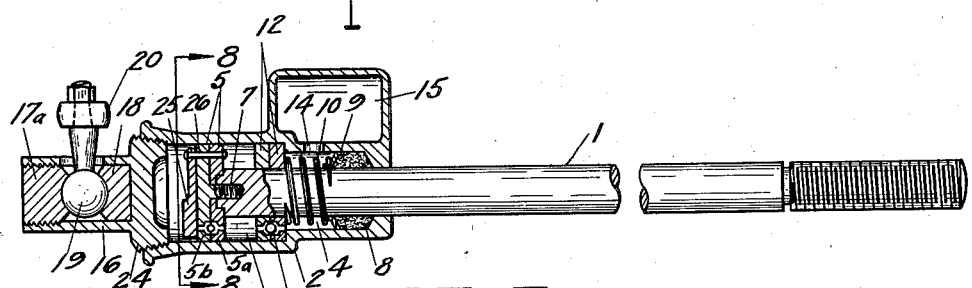
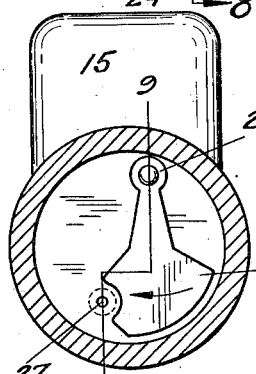
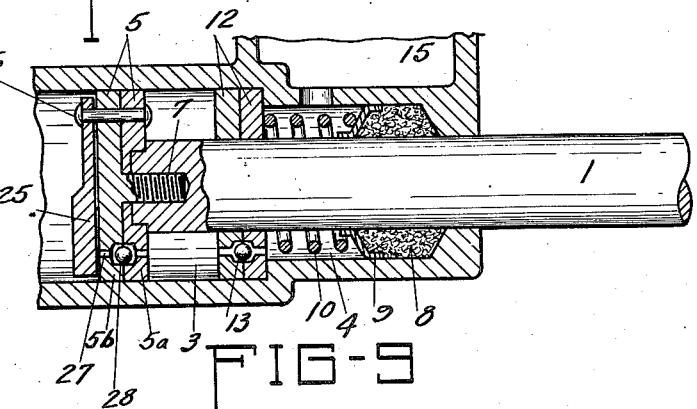
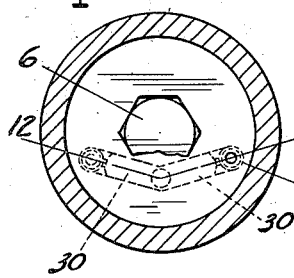
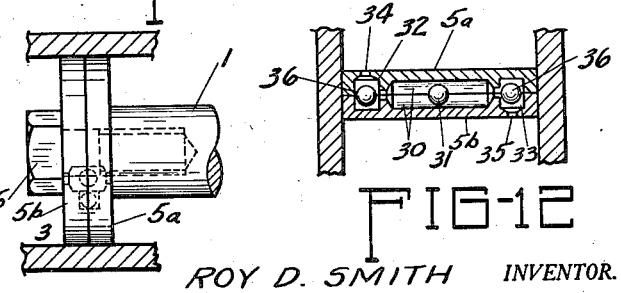
ROY D. SMITH  INVENTOR.
BY
Merrill M. Blackburn,
ATTORNEY.

Patented Aug. 25, 1936

2,052,257

UNITED STATES PATENT OFFICE 2,052,257

AUTOMATIC WHEEL ALIGNER

Roy D. Smith, Davenport, Iowa, assignor to Bee Line Manufacturing Company, Davenport, Iowa, a corporation of Iowa Application January 22, 1934, Serial No. 707,742

15 Claims. (Cl. 280—95)

This invention relates to a part of the steering system of an automobile and more particularly to a group of parts which function in such a manner as to cause the front wheels of a pneumatic tired vehicle to assume positions relative to each other such that said front wheels will always be retained in true running alignment with relation to each other at the points at which the surfaces thereof contact the road.

Among the objects of this invention are to so modify the steering mechanism of motor vehicles of the character indicated that the steering wheels of the vehicle will always assume proper relative positions with relation to each other to reduce to a minimum the wear upon the tires of the vehicle; to so construct the steering mechanism of the vehicle that wheel shimmy will be eliminated; to so construct the steering mechanism of a motor vehicle that errors of wheel camber, axle caster, angle of steering arms, etc. will be automatically neutralized and that the vehicle will function properly regardless of such errors; and such further objects, advantages, and capabilities as will hereafter appear and as are inherent in the construction disclosed herein. My invention further resides in the combination, construction, and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Figs. 1 and 2 are more or less diagrammatic views of the front wheels and connected steering mechanism, Fig. 1 showing a more or less conventional front axle and Fig. 2 a construction in which the front axle is eliminated, the front end of the frame being supported with relation to the wheels by means of frame members projecting laterally from the frame proper;

Figs. 3, 4 and 5 illustrate different conditions of side stress occurring in the tires and are useful in the explanation of what takes place during the operation of a vehicle;

Figs. 6 and 7 are broken sectional views illustrating two embodiments of the present invention;

Fig. 8 is a transverse sectional elevation taken substantially along the plane indicated by the line 8—8, Fig. 7;

Fig. 9 is a fragmentary longitudinal section taken substantially along the broken plane indicated by the line 9—9, Fig. 8, with one of the parts in a slightly different position than that shown in Fig. 8;

Fig. 10 is a transverse section illustrating a slightly different construction than that shown in Fig. 8;

Fig. 11 is a sectional view at right angles to the section shown in Fig. 10;

Fig. 12 is a section taken substantially along the broken plane indicated by the line 12—12, Fig. 10.

The customary tie-rod is indicated in Fig. 1 as having been replaced by a tie-rod constructed in accordance with my invention as illustrated in Fig. 6. The function of the ordinary tie-rod is to hold the steering wheels substantially rigid with relation to each other while that of my improved tie-rod is to permit a certain amount of movement of one wheel with relation to the other. It will be observed that when the crank arms of the two steering wheels are tied together by means of a rigid tie-rod of fixed length, both wheels will be positively steered when the steering wheel of the vehicle is turned. During the description of my present invention, it will be shown that only one of the wheels is positively steered and that the other one is, to a certain extent, free to choose its own course and adapt same to the course followed by the positively steered wheel. Of course the conventional tie-rod is adjustable as to length in order to provide means for adjusting the toe-in condition of the front wheels. The proper adjustment of a tie-rod is dependent upon several other conditions in the front end assembly of an automobile, as well as the speed of travel and kind of road surface over which the car is running. Therefore, it is necessary to adjust the conventional tie-rod for proper wheel alignment. The best engineers in the automobile industry agree that only an average or approximate adjustment can be obtained and that this is only a temporary adjustment, due to the fact that no automobile using a conventional axle and tie-rod assembly will maintain its original alignment while in service.

Actual road tests of several thousand miles have proven conclusively that the telescoping, self-adjusting tie-rod shown in Fig. 1 will provide perfect wheel alignment, making its own adjustment for any variations in the following factors: wheel camber, axle caster, angle of steering arms, type of tire, and condition of road. Type of road surface and variable speed at which car is driven will be explained hereinafter.

The structure shown in Fig. 6 will first be described because that is of more general application than the one shown in Fig. 7. Both comprise a rod 1 and housing 2, the latter of which is divided into two compartments 3 and 4. The rod 1 extends through the compartment 4 and into the compartment 3 which will hereinafter be referred to as the cylinder. Within this cylinder and secured to the end of the rod 1 is the piston 5 which is made up of the elements 5a and 5b. In Fig. 6 this piston is shown as secured to the end of the rod 1 by means of a bolt 6 while, in Fig. 7, a screw-threaded stud 7 projects from one face of the member 5b and is screwed into the end of the rod 1.

In the compartment 4 is a packing 8 surrounding the rod 1 and held tightly against the rod and the end of the compartment by means of a packing-washer 9 and spring 10. As shown in Fig. 6, the end of the compartment 4 is closed by a hollow plug 11 which is screwed into the compartment and whose inner end engages one of a pair of guide-plates 12 which have aligned coöperating sockets and perforations within which is a ball 13 which cpacts with the plates 12 to constitute a check valve. One of the plates 12 engages a seat formed at the inner end of the cylinder and is compressed against same by the inner end of the plug 11. A hole 14 is formed through the wall of the plug 11 so that the interior of this plug may communicate with an oil-overflow chamber 15 formed on the upper side of the housing.

A hollow extension 16 is formed on the end of the cylinder and contains a pair of blocks 17 and 18 which have partially cylindrical concavities on their faces directed toward each other, the purpose of which is to engage the ball 19 connected to the crank-arm 20 in any suitable manner. The block 18 is illustrated as being adjacent the end of the cylinder and the block 17 upon the opposite side of the ball 19. The block 17 is shown as having a projection 21 which extends into a socket in the member 22 which serves as a closure for the open end of the extension 16. A spring 23 surrounds the projection 21 and engages at one end with the block 17 and at the other end with the closure member 22. Within and between the plates 5a and 5b is a species of check valve whose function will be referred to hereinafter. The structure of this is shown in detail in Figs. 10 to 12, inclusive.

Parts 16, 18, 19 and 20, as shown in Fig. 7, are substantially the same as those shown in Fig. 6. However, the block 17, closure 22, and spring 23 are replaced in this construction by a screw-threaded block 17a which serves the same purpose except that it eliminates the resiliency of the spring 23. In this construction, the extension 16 is formed on the outer face of a screw-threaded plug 24 which screws into the outer end of the cylinder 3 which, in this case, is open instead of closed as in the previously described construction. In this construction also the compartment 4 is connected to the oil-overflow chamber 15 by means of the opening 14. The plates 5a and 5b of the piston 5 are connected together and have a swinging gate-valve 25 pivotally connected thereto by means of the pin 26. This is shown in the drawings as being riveted at both ends. However, there is enough freedom of movement for the valve 25 so that same is free to swing about the pin 26 and cover the opening 27 extending through the piston. Between its outer ends, this opening 27 is enlarged to form a compartment between the plates and within this compartment is a ball 28 which acts as a check-valve. In Fig. 8, an arrow has been drawn on the gate-valve 25 to indicate the direction which this valve swings when the brakes of the automobile are suddenly put on. In Fig. 9, this gate-valve is shown in section in the position it would occupy if swung forwardly in Fig. 8 to cover the opening 27.

The valve in the piston 5 of Fig. 6 will now be described more particularly in connection with Figs. 10 to 12, inclusive. Channels 30 are shown most clearly in Fig. 12 as being formed in the inner faces of the plates 5a and 5b. These channels face each other and have a ball 31 therein which may move to either end of the compartment formed by the channels. At either end of the compartment this ball may act as a check valve to restrict the flow of oil through the piston 5. Beyond either end of the compartment formed by the channels 30 is a compartment, the same being designated by the numerals 32 and 33. The compartment 32 has an opening 34 extending through the plate 5a while the compartment 33 has an opening 35 extending through the plate 5b. From this it is clear that a slow flow of oil is permitted through the opening 35, compartment 33, compartment 30, compartment 32, and opening 34, from one side of the piston 5 to the opposite side thereof. However, if the piston is moved quickly in either direction, one of the balls 36 will be caused to close either opening 34 or opening 35 and thus serve as a check valve to prevent undue transfer of oil from one side to the other of the piston. This, therefore, prevents any sudden and great change in the length of the tie-rod which would result from any considerable amount of movement of the piston 5. If the brakes should be applied suddenly, the tendency will be for the ball 31 to roll to the forward end of the compartment 30 and engage its seat at that end, thus acting as a check-valve. This serves to prevent misalignment of the wheels caused by sudden stopping.

The form of construction shown in Fig. 6 is adaptable to the type of construction shown in Figs. 1 and 2, while that shown in Fig. 7 is more particularly designed for the layout of Fig. 1. This is due to the fact that the valve 25 would be substantially useless in the structure shown in Fig. 2.

On account of the oil contained in compartment 15, compartments 3 and 4 are kept full at all times. In order for the piston to move, it is necessary for it to cause the fluid to move from one side to the other of the piston. This it does by flowing through the opening 27 which extends through the piston 5. When the tie-rod, as illustrated in Figs. 6 and 7, shortens, the piston 5 moves to the left and forces oil to flow through the piston. Naturally, this flow must be very slow or the check-valve will close, thus shutting off the flow of oil. On account of the shaft or rod 1 occupying a portion of the right hand part of chamber 3, the chamber will not have sufficient available capacity to receive all of the fluid forced out of the other end thereof. The excess oil will then be forced through the plates 12 and into the compartment 4 and from this through the opening 14 into the reservoir 15. When the tie-rod lengthens, there will be a flow of oil in the opposite direction and the excess of oil needed to fill the extreme end portion of the cylinder will be drawn from compartment 15. Since the opening through the piston 5 is small, the rate of flow of oil will be slow and the change in length of the tie-rod will be but slight and will be caused to take place slowly. Therefore, there is very high resistance to road shocks and vibrations of the front wheels, since these forces have a comparatively high frequency. Since the pressure upon the oil is very low, there will be very little leakage of oil from the oil compartment.

Since compartment 15 is never completely filled with liquid but contains, also, some air, the latter will yield and be compressed in the compartment, when the piston moves to the left. When movement of the piston in the opposite direction takes place, the pressure of the air tends to cause flow of the oil into the cylinder to fill the excess space. It should be understood that the amount of relative movement of the cylinder and piston is never great and the amount of liquid passing is not large. Nevertheless there is a sufficient flow to permit the change in toe-in required in going around corners and also to permit one wheel to shift independently of the other on account of road obstructions and changes in character and shape of road surface. The oil in compartment 15 also furnishes a reserve supply to compensate for leakage over a long period of time.

Figs. 3, 4 and 5 are intended to illustrate why the aligner operates in a certain manner. Fig. 4 is a transverse section of a lower part of a tire, looking forwardly, in the case of a front wheel which has excessive toe-in. As the car is moved forwardly, the tread of the tire, as it contacts the road, will have a tendency to move sidewise in a direction toward the center of the vehicle. Since the two tires have opposite tendencies, such movement cannot take place and the tire must therefore slide sidewise somewhat and this will cause the center of the road-contact area to be near the outer shoulder of the tread. The outer shoulder being less in diameter than the central portion, the difference in the circumferential distance will cause the wheel to assume a position, if not restrained by a rigid connection to the opposite wheel, such that the center of road-contact area will be near the center of the tread. When the automatic aligner, shown in Fig. 6 or Fig. 7, forms a connecting member to the opposite wheel, the action is as follows: As the wheel pulls itself into a balanced running position, the rod 1 moves into the cylinder 3, forcing the oil out of the space in front of the piston into the space on the opposite side thereof and from this into the compartment 15.

Fig. 3 is a view similar to Fig. 4 but illustrates the condition of the tire when there is excessive toe-out. As the wheel rolls forward, the tread of the tire will be forced outwardly and the tire will have its central part of road contact near the inner shoulder of the tire and this also has a less circumferential distance than the center of the tread. Therefore, if the tire is free to choose its own direction, it will assume a position approximately parallel to the opposite tire. Under such a condition, the rod 1 will be pulled outwardly from the cylinder 3, carrying with it the piston 5 and this will cause a flow of oil in the opposite direction from that previously described. This capacity for lengthening or shortening of the tie-rod makes it possible for the wheels to slowly change their relative positions so that they will have proper relation. Since the oil cannot flow rapidly, there can be no sudden change in the position relationship of the two wheels.

Fig. 5 illustrates an exaggerated condition of wheel camber. As the wheel is rolled, the center of road-contact area is outward toward the outer shoulder of the tire. The outer shoulder, having less circumferential distance than the center of the tread, will cause the tire to assume a position, with respect to the opposite wheel, that will cause the road-friction forces to balance themselves.

As the speed of the car increases, there are certain centrifugal forces in the tires of an automobile which cause the tire to increase in diameter and have less road-contact area. The amount of road-contact area of a tire has a definite relation to the wheel-alignment condition and, therefore, this automatic tie-rod will adjust itself to any condition of speed, due to the change in effective road-contact area.

Also, various types of road surfaces will cause the tire to have greater or less road-contact area and therefore the front wheels will have a tendency to seek a different alignment as the road surface changes. Since this automatic aligner will maintain true alignment of the wheels, according to the momentary road-contact area and form, it is reasonable and has been proven by experience that the wheel alignment is extremely insensible to changes in axle caster.

If the front wheels roll without road-contact friction, due to misalignment, there is less chance of a shimmy or sidewise vibration of the wheels, and should a shimmy ever start in either wheel, it will promptly be dampened out, due to oil pressure, and the hydraulic cylinder 20, which will allow only a slow movement, will prevent the two wheels from becoming synchronized in a sidewise vibration known as shimmy.

As previously pointed out, the balls in the oil passages act as check-valves for unusual conditions of driving. If a car should turn a sharp corner at a high rate of speed so that there is very little weight on the tire upon the inside of the curve, then the balls roll to the ends of the passages and stop the flow of oil caused by the outer tire resisting the curve by means of transverse tire deflection due to centrifugal force and gyroscopic action of the wheel.

The operation of the pendulum 25 has already been explained and it will be understood that when a severe application of the automobile brakes takes place the pendulum swings forward, covering the opening and trapping the oil in the cylinder 3 which prevents the braking effect of the front wheels from moving the piston 6 and causing a toe-out condition of those front wheels.

Under ordinary conditions of oil flow, the balls in the oil passages remain at rest and do not resist the piston movements. However, unusual outside force, such as caused by braking, centrifugal force from short high-speed curves, and shimmy vibrations may cause the balls to become active and serve as check-valves. An automobile may be parked or turned in short space much more easily than with a conventional tie-rod, due to the fact that the opposite wheel may seek a position of perfect alignment with the positively steered wheel, regardless of the angle to which turned. Attention is also called to the fact that a slight bend or twist of the axle or of the steering arm will not cause misalignment, since the aligner will automatically cause the wheels to become properly aligned for the new condition.

It will of course be understood that the specific structure herein described may be departed from without departing from the spirit of my invention as set forth in this specification and in the appended claims.

Having now described my invention, I claim:

1. A tie-rod for a motor vehicle having means adjacent its ends for attachment of the rod to the steering arms of the vehicle, and means intermediate the ends for enabling the ends to move slowly relatively to each other, said last named means comprising a cylinder connected to one end of the tie-rod and a piston connected to the other end thereof, said piston having a passageway therethrough and valve means for controlling flow of fluid through the passageway.

2. A structure as defined by claim 1 having a leak proof overflow oil compartment connected therewith for the reception of fluid forced out of the cylinder by movement of the piston.

3. A structure as defined by claim 1 in which the valve means comprises a swinging gate member to cover the passageway.

4. A structure as defined by claim 1 in which the valve means comprises a ball-check for closing the passageway.

5. A motor vehicle tie-rod comprising a cylinder connectible to one of the steering arms of the vehicle, a rod connectible to the other steering arm, said rod extending longitudinally into said cylinder, a piston at or adjacent the end of said rod within the cylinder and movable longitudinally of the cylinder by relative movement of the rod and cylinder, a compartment at one end of the cylinder through which the rod reciprocates, a partition separating the cylinder and the compartment, said partition having a passageway therethrough for the passage of liquid, and valve means to control the flow of liquid through said passageway.

6. A structure as defined by claim 5 having a fluid overflow compartment connected with the first mentioned compartment to receive fluid forced out of the cylinder.

7. A tie-rod for motor vehicles comprising a pair of non-rigidly and non-resiliently connected sections to be connected to the steering arms of the vehicle, one of said sections having a piston connected to an end portion to cooperate with the other section, said other section being hollow and having the piston fitting slidably therein, and said piston having a passageway therethrough for permitting slow flow of liquid through the piston as the piston slides in the section in which it is slidably fitted.

8. A structure as defined by claim 7 in which the passageway through the piston extends longitudinally part way through, then laterally within the piston for a distance, and then longitudinally the remainder of the way through, said passageway having balls therein for controlling the flow of liquid through the piston.

9. In a motor vehicle tie-rod, the combination of a cylinder to be connected to one of the steering arms of the vehicle, a rod to be connected to the other steering arm, said rod extending longitudinally into said cylinder, a piston adjacent the end of said rod within the cylinder and movable longitudinally within the cylinder by relative movement of the rod and cylinder, a compartment at that end of the cylinder through which the rod reciprocates, a fixed partition separating the cylinder and compartment and having an opening therethrough connecting them, and a second compartment located at one side of the axis of the first compartment and receiving overflow fluid from the cylinder.

10. A tie-rod for motor vehicles comprising a pair of non-rigidly and non-resiliently connected sections to be connected to the steering arms of the vehicle, one of said sections having a piston connected to an end portion to cooperate with the other section, and said other section being hollow, having the piston fitting slidably therein, and having an overflow compartment connected to the upper part thereof to receive fluid forced out of the hollow thereof and to feed the fluid back into said hollow.

11. In a motor vehicle tie-rod, the combination of a cylinder to be connected to one of the steering arms of the vehicle, a rod to be connected to the other steering arm, said rod extending longitudinally into said cylinder, a piston adjacent the end of said rod within the cylinder and movable longitudinally within the cylinder by relative movement of the rod and cylinder, a compartment at that end of the cylinder through which the rod reciprocates, a normally fixed partition separating the cylinder and compartment and having an opening connecting them, said compartment extending from below said opening to a point well above said cylinder.

12. A structure for the purpose indicated comprising a body member having a normally fixed partition therein dividing same into two compartments, said partition having an opening for the passage of liquid, said partition and an end of said body member having aligned openings therethrough for the reception of a rod, a rod slidably fitted in said openings and passing through one of said compartments, and a piston on said rod fitting slidably in the other compartment, one of the compartments having an extension normally extending, in use, above the two compartments to furnish a reservoir from which fluid may be fed to said compartments for the purpose of constantly maintaining them full.

13. A tie-rod for a motor vehicle having means adjacent its ends for attachment of the rod to the steering arms of the vehicle, yielding means intermediate the ends for enabling the ends of the rod to move slowly relatively to each other, said last named means comprising a cylinder connected to the inner end of one section of the tie-rod and a piston connected to the inner end of the other section thereof, said piston having a passageway therethrough, the end of the cylinder which is connected to the tie-rod section being closed against passage of fluid therethrough, and a leak-proof overflow oil compartment connected with the cylinder for the reception of fluid forced out of the cylinder by movement of the piston.

14. In a motor vehicle tie-rod, the combination of a cylinder to be connected to one of the steering arms of the vehicle, a rod to be connected to the other steering arm, said rod extending longitudinally into said cylinder, a piston adjacent the end of said rod within the cylinder and movable longitudinally within the cylinder by relative movement of the rod and cylinder, a compartment at that end of the cylinder through which the rod reciprocates, a normally fixed partition separating the cylinder and compartment, and a second compartment located at one side of the axis of the first compartment and receiving overflow fluid from the cylinder, the structure having open communication between the cylinder and second named compartment to permit flow of said fluid between them.

15. A tie-rod for a motor vehicle comprising a rod and means for connecting its ends to the steering arms of the vehicle, the connecting means at one end of the rod comprising a casing, a partition wall within the casing fixed with relation to the casing, a relatively movable member cooperating with said wall, and fluid in the casing to pass from one side to the other of said partition wall as the movable member shifts with relation to said wall.

ROY D. SMITH.